United States Patent [19]

Warner

[11] Patent Number: 5,413,407
[45] Date of Patent: May 9, 1995

[54] ENGAGEMENT MEMBER FOR TRACK ASSEMBLY COMPONENTS

[76] Inventor: Joseph G. Warner, 33828 Stonewood, Sterling Heights, Mich. 48077

[21] Appl. No.: 118,350

[22] Filed: Sep. 9, 1993

[51] Int. Cl.⁶ .............................................. B62D 55/14
[52] U.S. Cl. ........................................ 305/56; 305/24; 152/211
[58] Field of Search .................... 305/24, 28, 56, 57, 305/35 R, 35 EB, 38; 152/210, 211, 393, 394

[56] References Cited

U.S. PATENT DOCUMENTS

| | | | |
|---|---|---|---|
| 1,169,575 | 1/1916 | Seidel | 152/393 |
| 1,397,795 | 11/1921 | Clifford-Earp | 152/393 X |
| 2,121,956 | 6/1938 | Eger | 152/211 |
| 2,424,647 | 7/1947 | Bernkull | 152/210 |
| 2,881,904 | 4/1959 | Hoerth | 305/38 X |
| 3,160,190 | 12/1964 | Jediny | 152/211 |
| 3,381,734 | 5/1968 | Barassi et al. | 152/211 X |
| 3,842,880 | 10/1974 | Keinanen | 152/211 X |
| 4,425,008 | 1/1984 | Weeks | 305/56 X |

FOREIGN PATENT DOCUMENTS

| | | | |
|---|---|---|---|
| 0176796 | 4/1986 | European Pat. Off. | 305/28 |
| 3909043 | 9/1990 | Germany | 305/54 |

*Primary Examiner*—Russell D. Stormer
*Attorney, Agent, or Firm*—Peter A. Taucher; David L. Kuhn

[57] ABSTRACT

Disclosed is an improved structure for rubber bodies such as pads on track units or tires on road wheels for tracked vehicle such as tanks. The rubber bodies have an array of bores with metallic inserts recessed in the bores. The inserts stiffen the pad or tire to reduce deformation under load and the heat produced thereby, and also transfer the heat to the surrounding air. In one embodiment, the inserts are cups closely fitting in the bores and having fins or other protrusions extending from the cup into the rubber body. In other embodiments, the inserts comprise heads near an exposed surface of the rubber body and shanks extending from the heads to a metal substrate underlying the rubber body and forming part of the track unit or road wheel.

12 Claims, 4 Drawing Sheets

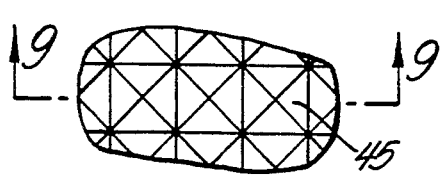
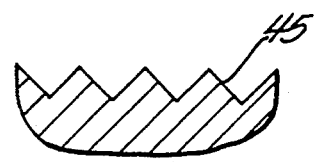
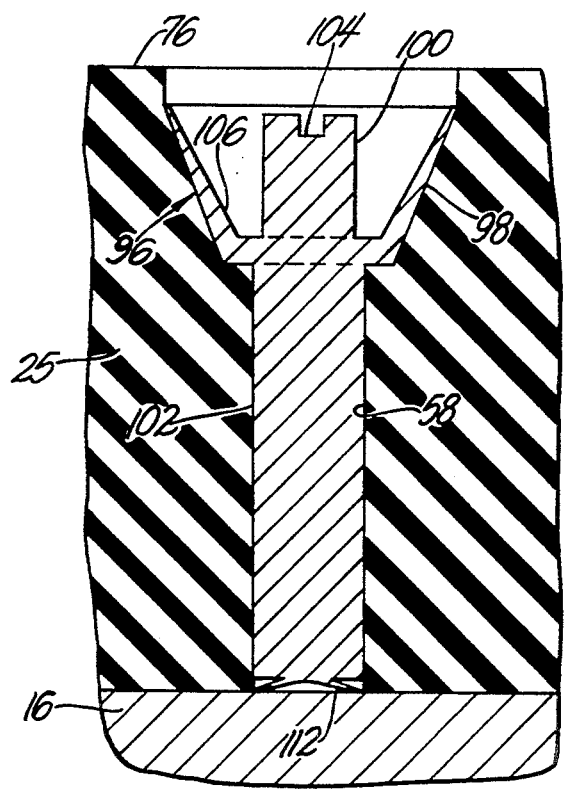
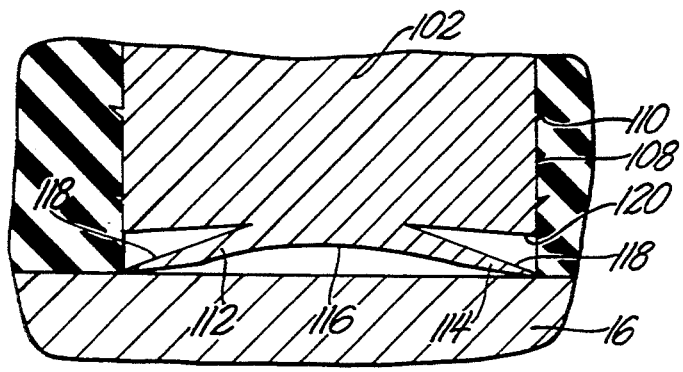
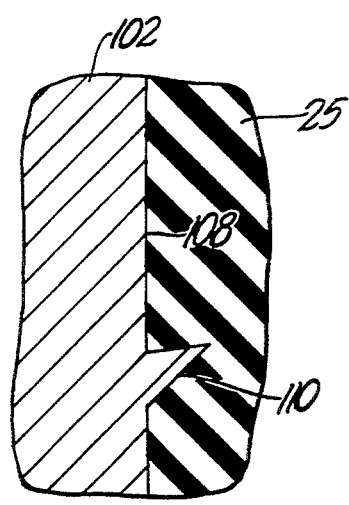

ENGAGEMENT MEMBER FOR TRACK ASSEMBLY COMPONENTS

GOVERNMENT USE

The invention described herein may be manufactured, used and licensed by or for the U.S. Government for governmental purposes without payment to me of any royalty thereon.

BACKGROUND AND SUMMARY

A track assembly for tanks and similar track laying vehicles includes tracks made of individual track units linked together in a closed loop. The vehicle has sets of road wheels that roll over the section of track lying on the ground at a given time. Track units typically have upper pads engaging the road wheel and lower pads engaging the ground, while the road wheels have solid tires engaging the track units. The upper pads, lower pads and tires are all bodies made of rubber and are subjected to severe compression and sheer forces as the vehicle travels. Due to these forces, the rubber bodies undergo rapid elastic deformations, whereby internal friction within the bodies contributes to heat build up therein. Especially during high speed vehicle travel, the heat is often sufficient to blister and crack the rubber bodies, thereby causing their premature failure.

My invention is an improved structure for the rubber bodies that retards production of heat by internal friction and speeds heat dissipation from the bodies. My invention comprises a rubber body having an array of metallic inserts recessed therein, the inserts compressing the body before it is under load from the i vehicle. The inserts are configured to enhance heat flow from within the bodies not only to air adjacent the body but also to the metal of a track unit or road wheel adjacent the body.

BRIEF DESCRIPTION OF THE DRAWINGS

FIG. 8 is a detail view showing an optional knurled surface configuration for inserts made according to my invention.

FIG. 9 is a view taken along line 9—9 in FIG. 8.

FIG. 10 is a sectional view showing a still further embodiment of the insert.

FIG. 11 is a detail view of the insert shown in FIG. 10, FIG. 11 showing a disk-like spring at the base of the insert's shank.

FIG. 12 is another detail view of the FIG. 10 insert, FIG. 12 showing a barb on the shank of the insert.

DETAILED DESCRIPTION

Figure 1:
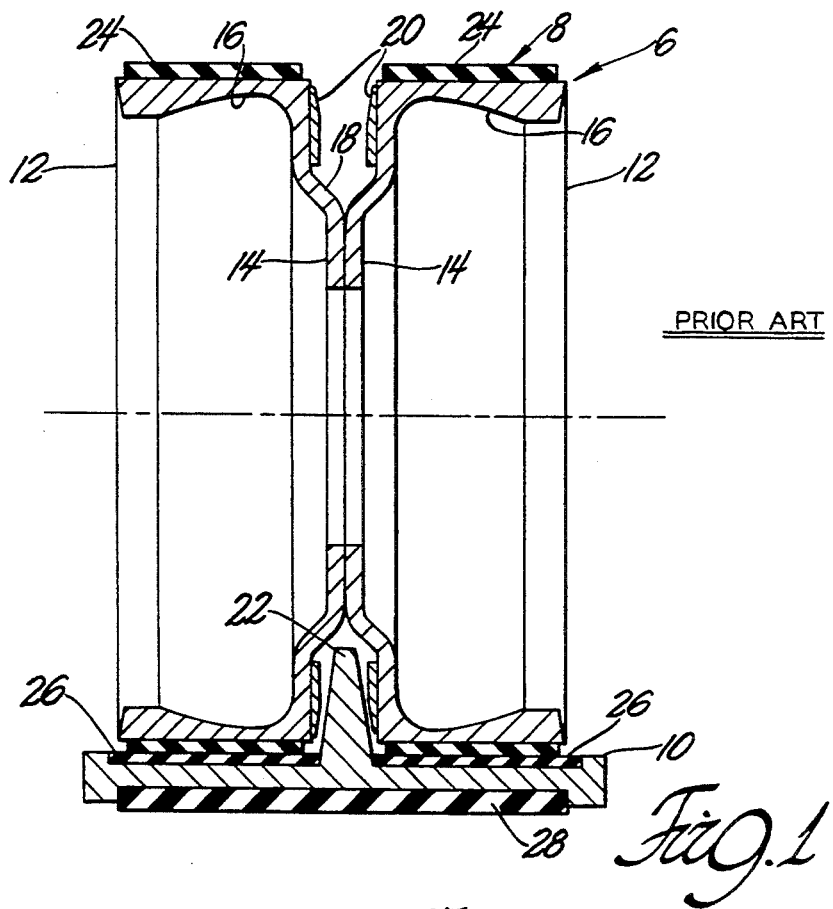
FIG. 1 is a sectional view of a conventional road wheel and track unit found on the track assembly of a typical track laying vehicle such as a tank.

FIG. 1 shows in section a conventional track assembly 6 for a tracked vehicle such as the U.S. Army's M1A1 Tank, the assembly having road wheel 8 rolling on track unit 10. Road wheel 8 has two wheel halves 12 each half being essentially crescent shaped in cross section and comprising a spider 14 integral with rim 16. The wheel halves are typically joined by bolts (not shown) and the radially outer zones of the spiders form annular channel 18. This channel engages center guide 22 of track unit 10 so that road wheel 8 stays properly aligned with the track unit as the road wheel rolls thereupon. Fixed to the sides of channel 18 are annular wear plates 20 which protect spiders 14 from abrasion damage by center guide 22. Fixed on the outside of rim 16 is the road wheel's engagement member or tire 24, which is an exterior band of solid rubber that bears on track unit 10. Unit 10 has complimentary wheel contacting engagement members comprised of rubber pads 26 set in recesses in the steel body of the track unit, pads 26 faced against tire 24. Unit 10 typically also has a ground contacting engagement member comprised of solid rubber pad 28 set in another recess of the track unit body opposed to the first recesses.

Figure 2:
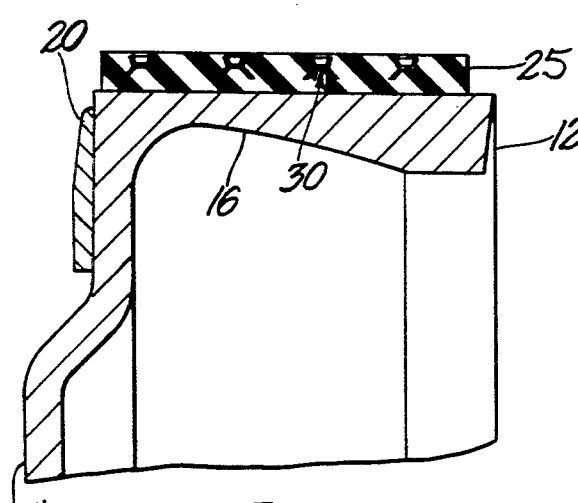
FIG. 2 is a detail sectional view of the road wheel's tire shown in FIG. 1, the tire being modified with metallic inserts according to my invention.

FIG. 2 shows a portion of a tire 25, which simply is tire 24 as modified to include inserts 30 according to one embodiment of my invention. It will be understood that pads 26 and 28 can be modified in a similar manner to tire 25. Insert 30 and surrounding structure are shown in greater detail in FIG. 3, wherein metal cup 32 of the insert is recessed with respect to outer surface 34 of tire 25 so that cup 32 does not contact pad 26 when tire 25 engages track unit 10. Cup 32 may be regarded as defined a cavity or hollow open toward the outer surface of tire 25 Cup 32 has a plurality of fins 36 extending both radially outward relative to cup 32 and toward interface 38 between tire 25 and rim 16. Faces 37 of the fins are oriented outward relative to the cup and toward surface 34. Fins 38 anchor insert 30 in tire 25 and provide a thermal path for heat within the tire to flow out through the insert.

Figure 3:
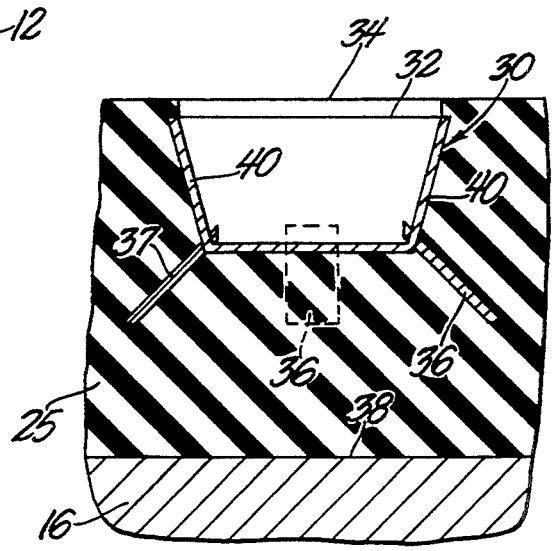
FIG. 3 is a sectional detail view of one of the inserts shown in FIG. 2.

It is preferred that sides 40 diverge in the radially outward direction relative to tire 25, as seen in FIG. 3. Divergence of walls 40 inhibits debris from becoming lodged in cup 30, so that air flow in the cup is unimpaired and heat transfer from cup 30 to the air is not thereby reduced. It is also preferred that insert 30 be stronger and less flexible than the surrounding material of tire 25, so that insert 30 stiffens the tire. The tire's greater stiffness lessens the tire's deformation under load and consequently reduces heat from internal friction resulting from that deformation.

Figure 15:
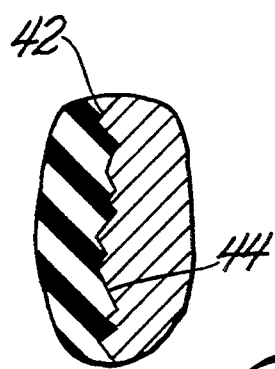
FIG. 15 is a detail sectional view showing an alternate surface structure for the inserts and the engagement of that surface with adjacent material of a tire or track pad.

It is further preferred that the entire surface of insert 30 be rough, as demonstrated by insert surface section 42 in Figure 15. The material of the tire will conformingly contact the surface of insert 30 in the manner shown by interface surface 44 of the tire material shown in FIG. 15. The insert's surface roughness causes more contact area of the insert with the tire and the air than if insert 30 had a smooth surface, whereby insert 30 has greater ability to transfer heat from the tire to the air. In the alternative to a simply roughened surface, insert 30 may instead have a regular, knurled surface 45 as demonstrated in FIGS. 8 and 9. Other known regularly patterned surfaces can be substituted for surface 45.

Figure 4:
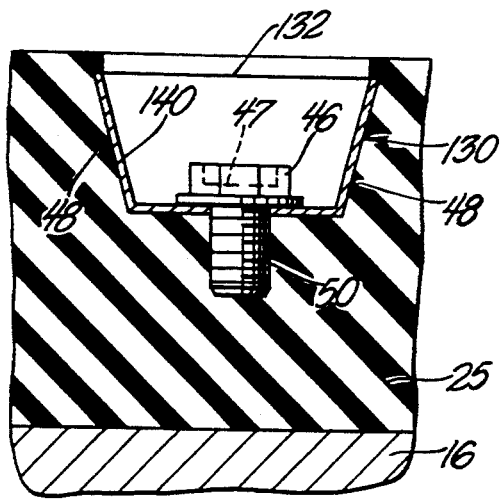
FIG. 4 is a sectional view showing a variation of the Figure 3 embodiment of the insert.

FIG. 4 shows a second embodiment 130 of the insert having cup 132 that is in all respects the same as cup 32, except that cup 132 lacks fins and has an orifice to accommodate bolt 46. Wall 140 has an interference fit with tire 25 so that the zone 48 of the tire immediately surrounding wall 140 is under compression. This compression is a pre-stressing that limits the tire's deformation when it bears under load against pad 26 of track unit 10, whereby heat from internal tire friction due to deformation is inhibited. 9 The shaft 50 of bolt 46, which threadingly engages tire 25, is shown in FIG. 4 as reaching only part way from cup 132 to rim 16. However, shaft 50 may optionally extend all the way to rim 16 as does shank 52 in FIG. 5 or even into rim 16 as does shank 54 in FIG. 6. The shaft's or shanks' contact with rim 16 improves heat flow from the tire to the rim. The head of bolt 46 may optionally be provided with a polygonal recess 47 to increase the effective heat radiation surface of the bolt 46 and to allow the bolt to be turned by an allen wrench.

Figure 5:
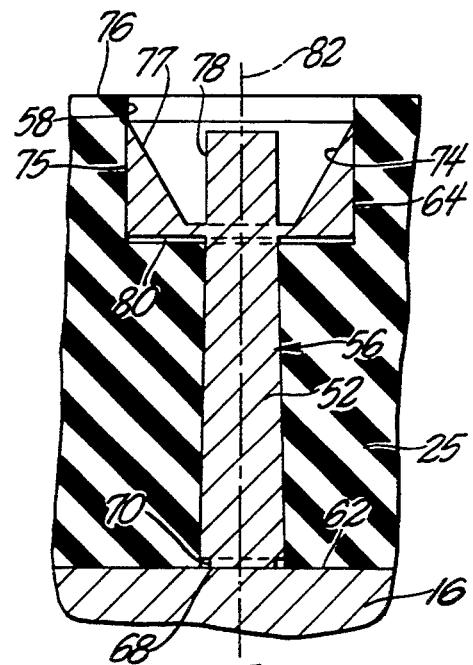
FIGS. 5 and 6 are sectional views showing further embodiments of the inserts.
Figure 7:
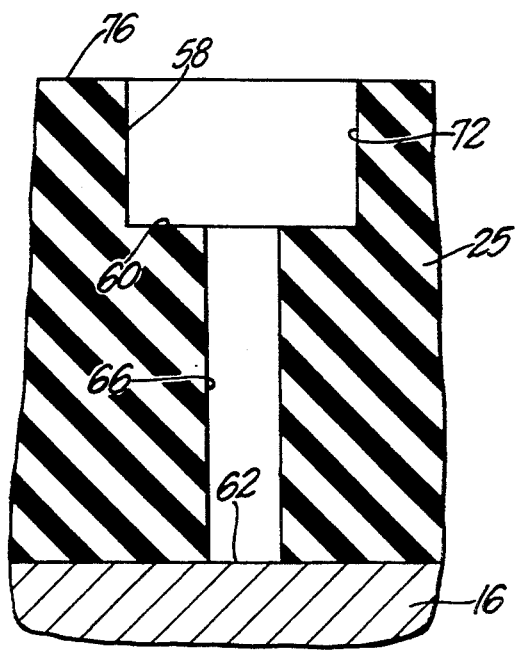
FIG. 7 is a sectional view showing the stepped bore which accommodates the inserts of FIGS. 5, 6 and 10.

FIG. 5 shows a third embodiment 56 of the insert, which interferingly fits in straight stepped bore 58 in tire 25, bore 58 being shown separately in FIG. 7. As seen in FIG. 7, bore 58 defines a shoulder 60 and is closed at one end by surface 62 of rim 16. Insert 56 can be made entirely of aluminum or other metal softer than the metal of which rim 16 is fabricated, and may have a roughened or knurled surface similar to that of the FIG. 3 embodiment.

Insert 56 has a shank 52 interferingly fit in the smaller diameter portion 66 of bore 58 and flaring slightly along a direction away from head 64. End 68 of shank 52 faces against the rim's surface 62 and has annular notch 70 that combines with adjacent potions of the tire and rim to define an annular void about end 68. As an option, the portion of end 68 surrounded by the annular void may be the only portion of insert 130 that is of softer metal than rim 16, the remainder of insert 130 being made, say, of steel. Another option is to replace the portion of end 62 surrounded by the void with a disk of metal softer than the metal of rim 16 and insert 56, the disk being of smaller diameter than shank 52.

Head 64 interferingly fits within larger diameter portion 72 of bore 58 and exterior surface 75 of the head's head annular wall 74 flares slightly along a direction away from outer surface 76 of tire 25. Within the head and integral therewith is heat radiator post 78, which is axially aligned with shank 52 and may have a polygonal radial cross section to facilitate gripping of the post by tools. The interior surface 77 of wall 74 diverges from post 78 in a direction toward tire surface 76, thereby decreasing the chance that debris will become lodged between post 78 and wall 74. It is noted that insert 56 in its FIG. 5 configuration forms a flat torroid shaped gap 80 adjacent head 64 and centered about shank 52.

Once insert 56 is in the FIG. 5 position, it is pushed along insert axis 82 toward and against rim surface 62 such that end 68 is permanently deformed. That is, end 68 is plastically and axially compressed while plastically expanded radially, whereupon end 68 tightly conformingly bears against the rim. At the same time, flat torroidal gap 80 is closed, whereby heat transfer between insert 56 and tire 25 is improved. The material of tire 25 exerts radially inward compression on head 64 and shank 62, thereby wedging insert 56 toward rim 16 due to the taper or flare of the head and shank. Consequently insert 56 stays in its new, more recessed position relative to the tire and maintains its more intimate contact with rim 16, whereby an improved heat transfer can occur between insert 56 and rim 16.

Figure 13:
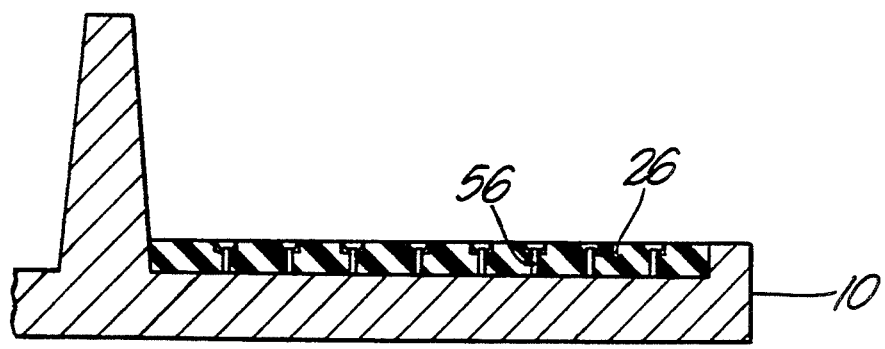
FIG. 13 is a partial sectional view of a track unit having an upper track pad modified to have inserts configured according to my invention.
Figure 14:
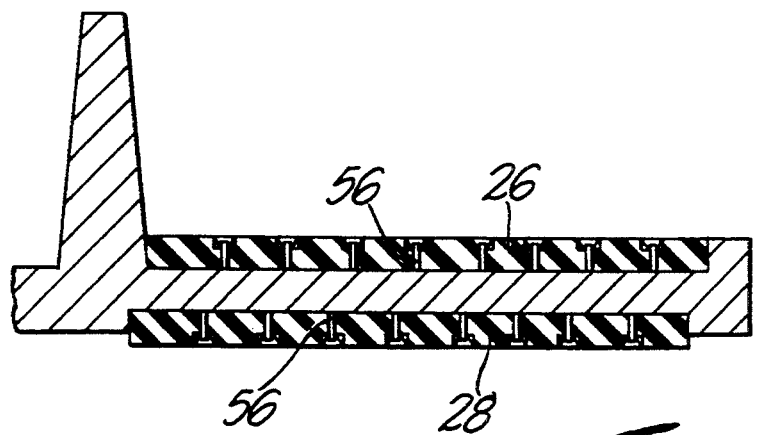
FIG. 14 is a partial sectional view of another track unit having both upper and lower track pads modified to have the inserts.

FIG. 13 shows track unit 10 having its rubber pad 27 modified to include inserts 56. FIG. 14 shows track unit 10 having both rubber pads 27 and 29 modified to have inserts 56 therein. It will be understood that other embodiments of the inserts can replace insert 56 in pads 27 and 29.

Figure 6:
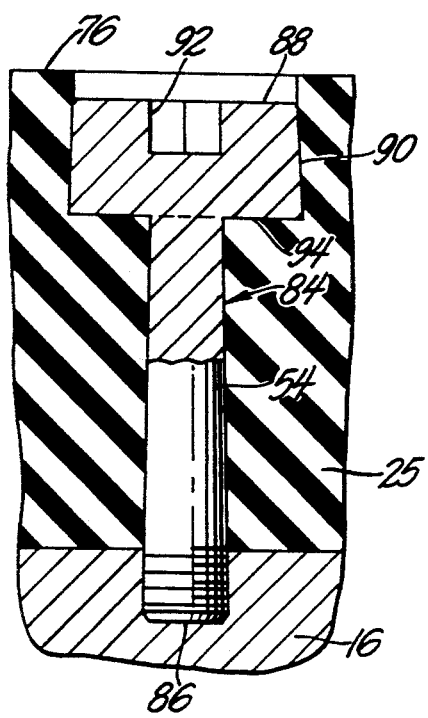

FIG. 6 shows a fourth embodiment 84 of the insert, which like the FIG. 5 embodiment, is designed to interferingly fit in stepped bore 58, and which can have optional surfaces such as those 19 described for the FIG. 3 embodiment. Insert 84 has a shank 54 interferingly fit in smaller diameter portion 66 of the bore, the shank's threaded tip 86 screwed into a complimentarily threaded aperture in rim 16. The screwed, fixed connection between insert 84 and rim 16 causes the insert to reinforce tire 25 against sheer forces acting parallel to tangents touching the tire. The section of shank 54 between threaded tip 86 and head 88 is slightly flared along a direction from the head to the tip. Head 88 is a solid body, is interferingly fit into larger diameter portion 72 of the bore and is recessed relative to surface 76. Head 88 defines a hole 92 having a regular polygonal cross section, whereby insert 84 can be screwed into rim 16 by use of an allen wrench or like tool. Outer surface 90 of head tapers slightly along a direction toward surface 76, and the head's shoulder surface 94 compresses tire material between the head and the rim.

In FIG. 10 is shown a fifth embodiment 96 of the insert imbedded in tire 25. Cup 98 of insert 96 flares radially outward with respect to rim 16 and tire 25, and is recessed with respect to outer diametrical surface 76 of the tire. Fixed within the head is radiator post 100, which axially aligns with shank 102 and has a polygonal radial cross section and a diametrical slot 104 to facilitate gripping of the post by tools. Circular wall 106 of cup 96 interferingly fits with the adjoining material of tire 25 and tapers as it extends toward surface 76 away from post 100.

Shank 102 is has an overall straight cylindrical configuration wherein the outer surface 108 (FIG. 11) of the shank fits closely but preferably not interferingly with the surrounding material of tire. As best seen in FIGS. 11 and 12, Shank 102 has a multiplicity of barbs 110 projecting therefrom into the material of tire 25, the barbs being slightly tilted radially outward relative to tire 25. At the end of shank 102 nearer rim 16 is a spring 112, which can be a bellville washer fixed to post 102 or which can be a concave disk integral with the post. Preferably, the outer peripheral zone 114 of spring 112 tapers to a sharp edge. When insert 96 is pushed toward rim 116, spring 112 compresses from its free position in FIG. 11 until concave spring surface 116 fully contacts rim 16 and opposed spring surfaces 118 fully contact post end surfaces 120. When the pushing force is released, barbs 110 prevent insert 96 from moving away from rim 16, whereby spring 112 stays in full contact with rim 116 and post 102.

I wish it to be understood that I do not desire to be limited to the exact details of construction or method shown herein since obvious modifications will occur to those skilled in the relevant arts without departing from the spirit and scope of the following claims.

I claim:

1. An engagement member for vehicle components such as road wheels and track units, comprising:
   an elastomeric layer faced on the component;
   an outer, exposed surface of the elastomeric layer;
   the elastomeric layer defining an aperture open at the outer surface, the aperture being a stepped bore having a larger diameter portion and a smaller diameter portion;
   a peripheral wall of the aperture;
   a rigid insert member conformingly fit to the peripheral wall of the aperture and recessed relative to the outer surface, the insert member being more thermally conductive than the elastomeric layer;
   the insert member defining a hollow open toward the outer surface;
   a head of the insert member in the larger diameter portion of the bore, the head defining the hollow;
   a shank of the insert member in the smaller diameter portion of the bore, the shank extending from the head into connection with the component;
   an inner surface of the hollow exposed to air.

2. The engagement member of claim 1 wherein the insert member is of metal and has a projection extended toward the component.

3. The engagement member of claim 2 wherein the insert member comprises a plurality of the projections in the form of fins extending out from the insert member and toward the component.

4. The engagement member of claim 1 further comprising:
   a component engaging zone of the shank softer than a region of the component engaged by the zone.

5. The engagement member of claim 4 wherein the component engaging zone is compressed plastically against the region of the component.

6. The engagement member of claim 1 wherein the head has a post within the hollow.

7. The engagement member of claim 1 wherein the shank closely fits in the smaller diameter portion of the bore and is in fixed engagement with the component.

8. The engagement member of claim 7 further comprising:
   a shoulder of the insert member faced toward the component;
   a compressed portion of the layer disposed between the shoulder and the component.

9. The engagement member component of claim 1 wherein the insert member has a roughened surface engaged with the elastomeric layer.

10. The engagement member of claim 1 further comprising means on the insert member for permitting insertion of the insert member into the bore and preventing extraction of the insert member from the bore.

11. The engagement member of claim 10 wherein the permitting means is comprised of a barb on the shank.

12. The engagement member of claim 10 further comprising a flexible disk between the shaft and the component, the disk curved in its free state and flatly sandwiched between the shank and the component its compressed state.

* * * * *